United States Patent [19]
Miyamori et al.

[11] Patent Number: 5,537,165
[45] Date of Patent: Jul. 16, 1996

[54] MOTION PICTURE FILM AND REPRODUCING DEVICE THEREFOR

[75] Inventors: Shinji Miyamori; Masatoshi Ueno, both of Tokyo, Japan

[73] Assignee: Sony Corporation, Tokyo, Japan

[21] Appl. No.: 175,572

[22] Filed: Dec. 30, 1993

[30] Foreign Application Priority Data

Jan. 8, 1993 [JP] Japan ................................ 5-001865

[51] Int. Cl.[6] .............................. G03B 31/02; G11B 5/09
[52] U.S. Cl. .................................. 352/27; 352/37; 360/48
[58] Field of Search ............................. 352/1, 5, 8, 11, 352/26, 27, 29, 30, 37, 239, 236; 369/124, 125; 360/3, 32, 48; 371/10.1, 10.2, 10.3, 40.1

[56] References Cited

U.S. PATENT DOCUMENTS

| | | | |
|---|---|---|---|
| 4,202,018 | 5/1980 | Stockham, Jr. | 360/47 |
| 4,600,280 | 7/1986 | Clark | 352/37 |
| 4,707,818 | 11/1987 | Suzuki et al. | 369/59 |
| 5,155,510 | 10/1992 | Beard | 312/27 |
| 5,194,996 | 3/1993 | Shores | 360/48 |
| 5,327,182 | 7/1994 | Kohut et al. | 352/27 |

FOREIGN PATENT DOCUMENTS

| | | |
|---|---|---|
| 544090A1 | 6/1993 | European Pat. Off. . |
| WO9214239 | 8/1992 | WIPO . |

*Primary Examiner*—Michael L. Gellner
*Assistant Examiner*—Eddie C. Lee
*Attorney, Agent, or Firm*—William S. Frommer; Alvin Sinderbrand

[57] ABSTRACT

In a motion picture film of the present invention, audio data digitized from right channel analog audio signals is held in a recording region provided in a left channel digital sound track having the left channel audio data recorded in it, while audio data digitized from left channel analog audio signals is held in a recording region provided in a right channel digital sound track having the right channel audio data recorded in it. With a reproducing system for reproducing the motion picture film of the present invention, unless the left and right channels are destroyed simultaneously, the audio data reproduced from the sound track is used in substitution for the audio data from the destroyed channel to compensate for playback sound interruption.

2 Claims, 4 Drawing Sheets

MOTION PICTURE FILM AND REPRODUCING DEVICE THEREFOR

BACKGROUND OF THE INVENTION

This invention relates to a technique of recording and reproducing digital patterns as a sound track of a motion picture film.

The sound track of a conventional motion picture film is adapted for optically recording analog audio signals thereon. That is, in a recording/reproducing system for a digital sound track on a motion picture film, as disclosed in JP Patent Kokai-Publication No. 05-40938, provisionally published on Feb. 19, 1993, an analog audio recording track and a digital audio recording track are provided on the motion picture film. Analog audio signals are recorded on or reproduced from the analog audio recording track in accordance with the usual analog recording/reproducing system. On the other hand, high quality digital audio data is generated from the audio information of a particular channel and compressed digital audio data is generated from the audio information of the remaining channels, and each of these digital audio data is recorded on or reproduced from the digital audio recording tracks.

On the other hand, in the recording method as disclosed in JP Patent Kokai-Publication No. 5-109196, provisionally published on Apr. 30, 1993, digital data consisting of a pre-set number of data strings are optically recorded on respective digital audio data recording tracks. Since each 16-bit sample data is recorded in a square 4×4 matrix pattern, the rate of data errors along the longitudinal direction of the film is reduced to one-fourth of that when the 16-bit sample data is arrayed longitudinally. The rate of data errors along the width of the film may similarly be reduced as compared to the case in which the sample data is arrayed transversely across 16 tracks.

In contrast to these prior-art techniques, there has also been proposed in International Publication Number WO 92/14239 a motion picture film in which the film area between perforations for film feed is employed as a digital pattern recording region.

For projecting such motion picture film, sound reproduction with rich ambience and with high sound quality is required, while it is necessary to process playback data by error correction or error concealment.

In a digital equipment employing a conventional recording medium, such as a compact disc (CD), error correction is made using the cross-interleaved Reed-Solomon code for protecting data against random or burst errors. The extent of error correction capability is determined depending upon the nature of errors liable to be produced in a particular recording medium.

Meanwhile, the film area reserved for recording the audio signals is susceptible to damages by the film driving system, such that particularly long burst errors tend to be produced with increase in the number of times of film reproducing operations. For this reason, it is necessary to provided a longer interleaving length for eliminating sound interruptions. However, if the interleaving length is increased, phase deviation is incurred between the picture on the film and the audio information thus imposing constraints on the editing by manual film cutting which is the basic film editing technique. Thus there is a certain limitation to increasing the interleaving length.

OBJECTS AND SUMMARY OF THE INVENTION

In view of the above-described status of the art, it is a principal object of the present invention to provide a motion picture film in which high quality audio signals may be positively reproduced by digital signal processing techniques.

It is another object of the present invention to provide a motion picture film capable of reproducing a sound field rich in ambience.

It is a further object of the present invention to provide a motion picture film capable of performing error correction on audio data in the reproducing system for reliably reproducing the audio data.

It is a further object of the present invention to provide a motion picture film capable of reading a digital pattern of the digital pattern recording region of the motion picture film for reliably reproducing the audio data.

It is a further object of the present invention to provide a motion picture film capable of reproducing the sound field rich in ambience.

It is a further object of the present invention to provide a motion picture film capable of positively reproducing the audio data of plural channels.

It is a further object of the present invention to provide a motion picture film in which the audio data of plural channels may be positively reproduced by error correction performed on the audio data.

For accomplishing the above objects, there is provided, in one aspect of the present invention, a motion picture film having analog tracks having a plurality of channels including left channel analog audio signals and right channel analog audio signals recorded thereon and digital sound tracks having at least left channel audio data and right channel audio data recorded thereon, in which the motion picture film comprises a first recording area for audio data digitized from right channel analog audio signals and a second recording area for audio data digitized from left channel analog audio signals. The first recording area is provided in a left channel digital sound track and the second recording area is provided in a right channel digital sound track.

In a second aspect of the present invention, left and right channel audio data and audio data, each divided into a plurality of channels, are recorded on the left channel digital sound track and on the right channel digital sound tracks, respectively.

In a third aspect of the present invention, left and right channel audio data and audio data digitized from the left and right channel audio data are compressed with the same format and recorded on the digital sound tracks.

In a fourth aspect of the present invention, parity data by the cross-interleaved Reed Solomon code is appended to the compressed audio data and the resulting/data is recorded on the digital sound tracks.

In a fifth aspect of the present invention, there is provided a reproducing device for reproducing a motion picture film having analog tracks having left channel analog audio signals and right channel analog audio signals recorded thereon and digital sound tracks having at least left channel audio data and right channel audio data recorded thereon. The motion picture film has on the left channel digital sound track a recording region for audio data digitized from the right channel analog audio signals, and also has on the right channel digital sound track a recording region for audio data digitized from the left channel analog audio signals. The reproducing device comprises a data selector by which, when the audio data of the left and right channels are reproduced from the digital sound tracks of the respective channels, the audio data of destructed left and right channels are replaced by audio data of the left and right channels reproduced from the digital sound tracks.

In a sixth aspect of the present invention, there is provided in the reproducing device for a motion picture film a data selector by which, when the audio data of the left and right channels, each divided into plural channels, are reproduced from the digital sound tracks of the respective channels, the audio data of destructed left and right channels are replaced by audio data of the left and right channels reproduced from the digital sound tracks, respectively.

In a seventh aspect of the present invention, there is provided in the reproducing device for a motion picture film a processing means for expanding audio data reproduced from the digital sound tracks on which the left and right channel audio data and the audio data digitized from the left and right channel analog audio signals are recorded after compression with the same format.

With the first aspect of the present invention, pertaining to the motion picture film, the audio data digitized from right channel analog audio signals is held in a recording region provided in a left channel digital sound track having the left channel audio data recorded in it, while the audio data digitized from left channel analog audio signals is held in a recording region provided in a right channel digital sound track having the right channel audio data recorded in it, so that, unless the left and right channels are destroyed simultaneously, the audio data reproduced from the sound track is used in substitution for the audio data from the destroyed channel to compensate for playback sound interruption.

With the second aspect of the present invention, pertaining to the motion picture film, since the left channel audio data and the right, channel audio data, each divided into plural channels, are held by the digital sound tracks of the respective channels, so that multiple-channel audio data may be held, sound reproduction rich in the concert-hall presence may be achieved. Besides, the interrupt, in the reproduced sound may be prevented by substituting the data reproduced from the sound channel for the audio data of the destroyed channel.

With the third aspect of the present invention pertaining to the motion picture film, since the left, and right channel audio data and audio data digitized from the left and right channel audio data are compressed with the same format and recorded on the associated digital sound tracks, the digital data compressing operation may be performed easily by a common compressing operation.

With the fourth aspect of the present, invention pertaining to the motion picture film, since parity data by the cross-interleaved Reed Solomon code may be appended to the compressed audio data and the resulting data is recorded on the digital sound tracks, the reproduced audio data may be reproduced reliably.

With the fifth aspect of the present invention, pertaining to the reproducing device for the motion picture film, when reproducing the left channel audio data and the right channel audio data from the digital sound tracks of respective channels, the audio data of an occasionally destroyed left or right channel is replaced by a data selector by audio data of the left or right channels of the digital sound tracks, so that, unless the left and right channels are destroyed simultaneously, the data reproduced from the sound track may be substituted for the data reproduced from the destroyed channel to compensate for sound interruption to assure reliable sound reproduction.

With the sixth aspect of the present invention, pertaining to the reproducing device for the motion picture film, when reproducing the left channel audio data and the right channel audio data, each divided into a plurality of channels, from the digital sound tracks of respective channels, the audio data of an occasionally destroyed channel is replaced by the data selector by audio data of the left or right channels reproduced from the recording regions of the digital sound tracks, so that sound reproduction rich in the concert-hall presence may be achieved with the multi-channel audio data. Besides, the interruption in the reproduced sound may be compensated by substituting the data reproduced from the sound channel for the audio data of the destroyed channel.

With the seventh aspect of the present invention, pertaining to the reproducing device for the motion picture film, left and right channel, audio data and audio data digitized from the left and right channel audio data are compressed with the same format and recorded on the digital sound tracks of the motion picture film, and the reproduced audio data is expanded by expansion means for reproducing the audio data.

DESCRIPTION OF THE PREFERRED EMBODIMENT

Figure 1:
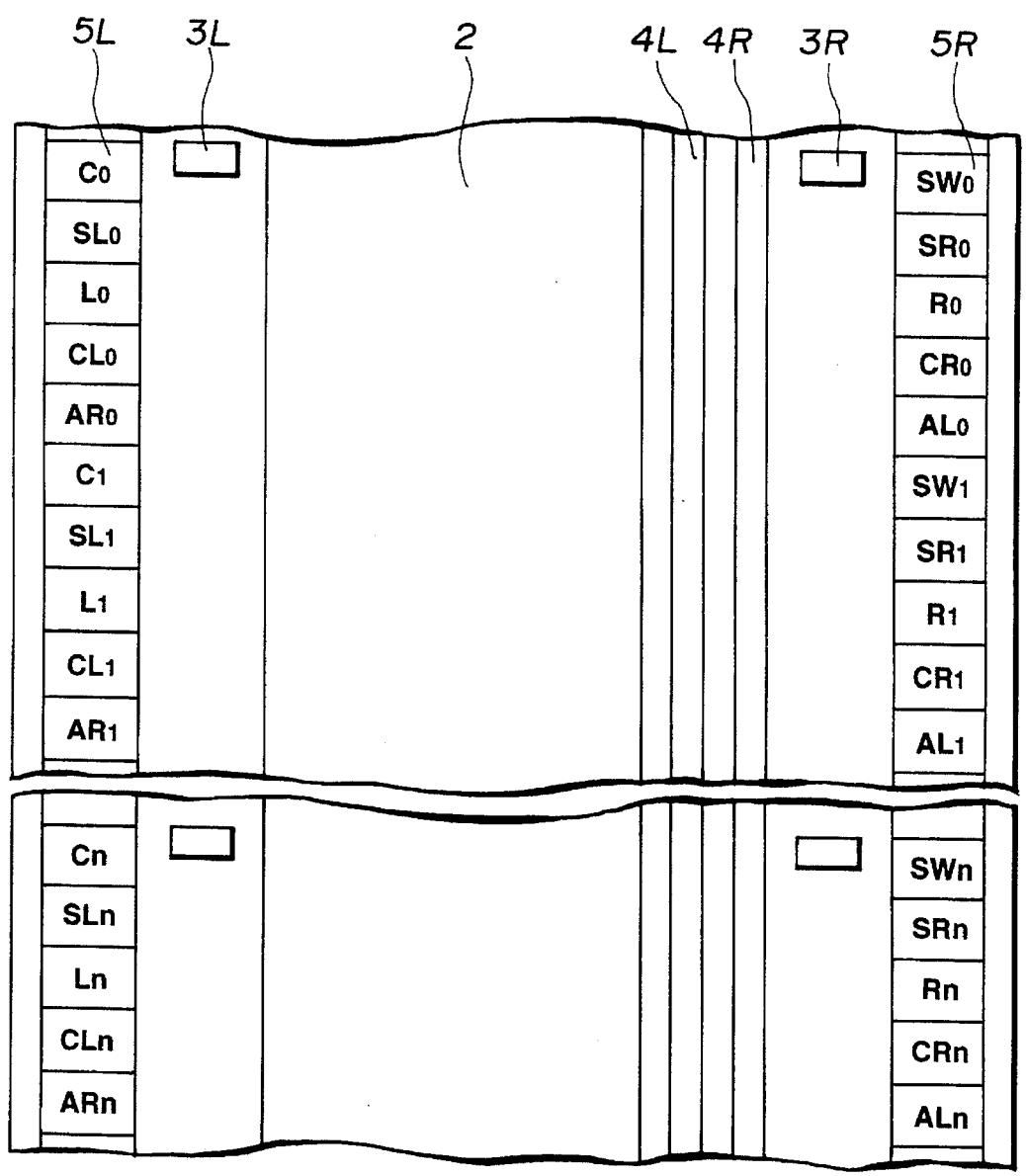
FIG. 1 is an enlarged partial plan view showing a motion picture film according to the present invention.

Referring to the drawings, a preferred embodiment of the present invention will be explained in detail.

The motion picture film according to the present invention is arranged as shown for example in FIG. 1. The motion picture film 1 comprises a picture recording area 2 in which to record a projected picture, perforations 3L, 3R for feeding the film 1 for transport, analog sound tracks 4L, 4R for enabling sound reproduction with conventional equipment, and digital sound tracks 5L, 5R in which to record multi-channel digital audio data.

Analog audio signals for left and right channels are recorded on the analog sound tracks 4L, 4R, respectively.

In the digital sound tracks 5L, 5R, audio data $C_n$, $SW_n$, $L_n$, $R_n$, $CL_n$, $CR_n$, $SL_n$ and $SL_n$ for eight channels, namely a center (C) channel, a sub-woofer (SW) channel, a left (L) channel, a right (R) channel, a center left (CL) channel, a center right (CR) channel, a surround left (SL) channel and a surround right (SR) channel, and audio data $AD_n$ and $AR_n$ for two channels, digitized from the analog audio signals for left and right channels. The audio data $C_n$, $SL_n$, $L_n$, $CL_n$ and $AR_n$ of the respective channels are recorded on the digital sound track 5L, while the audio data $SW_n$, $SR_n$, $R_n$, $CR_n$ and $AL_n$ of the respective channels are recorded on the other digital sound track 5R.

The digital audio data of the respective channels are compressed to a one-fifth data volume by high-efficiency coding suitably combined from sub-band coding, orthogonal transform coding and bit allocation. To the resulting compressed data are appended C2 parity and C1 parity data using cross-interleaved Reed-Solomon code. The resulting data are processed by 8-9 conversion for transforming 1-byte data into 9-dot pattern data, with a pre-set number of bytes as one block, for sequentially recording the resulting 9-dot pattern data on the digital sound tracks 5L, 5R on the block basis.

In this manner, with the motion picture film according to the present invention, the audio data $AR_n$, digitized from right-channel analog audio signals, are recorded on the digital sound track 5L in which the audio data $SL_n$, $L_n$ and $CL_n$ of the respective channels of the left system is recorded, while the audio data $AL_n$, digitized from left-channel analog audio signals, are recorded on the digital sound track 5R in which the audio data $SR_n$, $R_n$ and $CR_n$ of the respective channels of the right system is recorded. By so doing, if burst errors of extremely long duration be produced in, for example, the digital sound track 5L, and no errors are present in the other digital sound track, the left channel audio data $AL_n$ may be reproduced, so that left-channel pseudo signals may be generated from the left-channel audio data $AL_n$.

Figure 2:
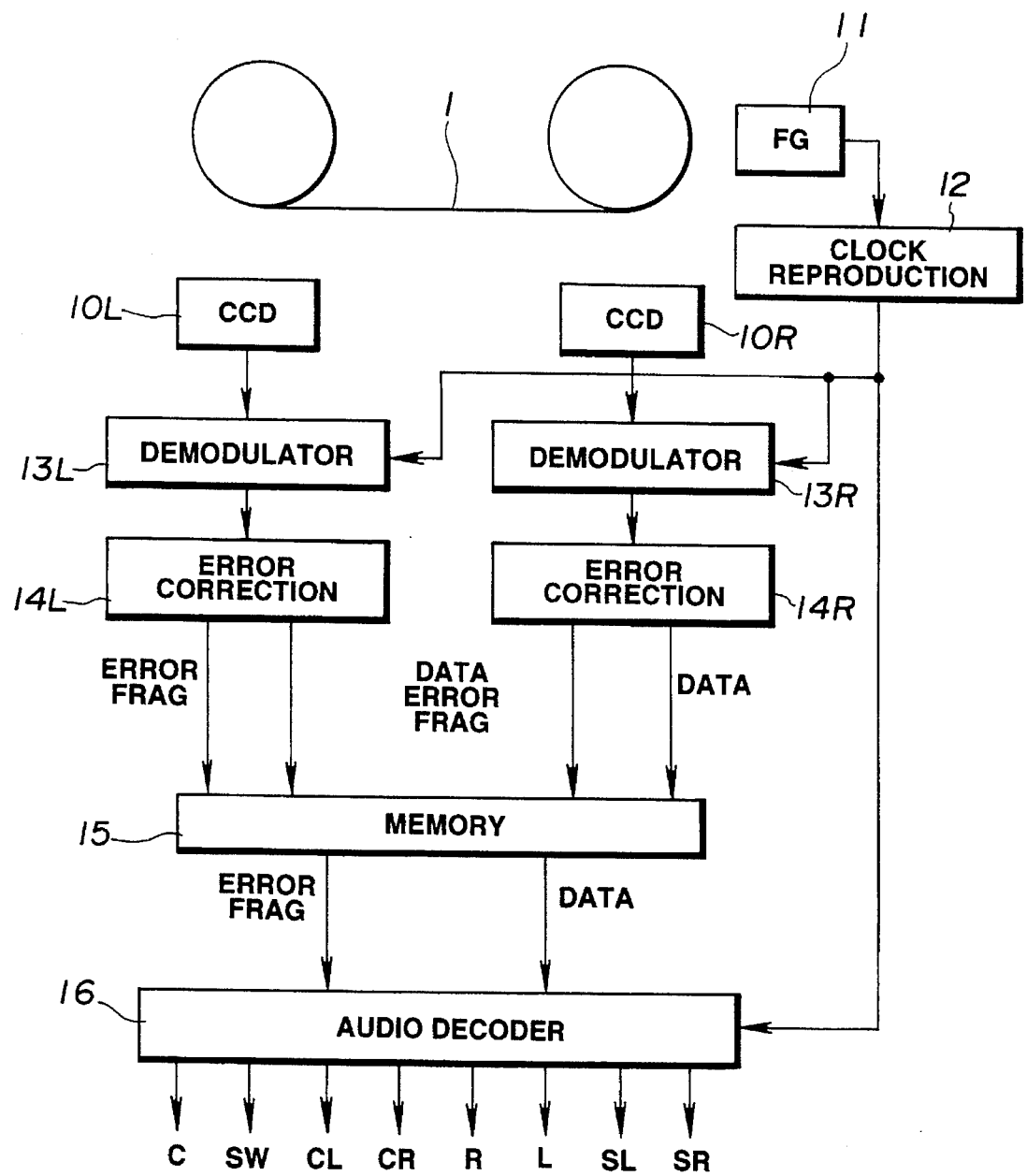
FIG. 2 is a block diagram showing an arrangement of a reproducing device for the motion picture film according to the present invention.

The reproducing device for the motion picture film according to the present invention is arranged and constructed as shown in FIG. 2.

The present reproducing system is adapted for reproducing the motion picture film 1 shown in FIG. 1, and is adapted for reading the digital audio data of the respective channels from the digital sound tracks 5L, 5R of the motion picture film 1 by CCD line sensors 10L, 10R for reproducing the 8-channel audio signals.

With the present reproducing device, a frequency signal generator 11 detects the passage of the perforations 3 of the motion picture film 1 by e.g. a photointerruptor to generate a frequency signal having a frequency proportional to the feed rate of the motion picture film 1, which is 96 Hz for the standard rate of feed. The playback clock generator 12 generates playback clocks of 44.1 kHz synchronized with frequency signals produced by the frequency generator 11 to supply the playback clocks to demodulator 13L, 13R and an audio decoder 16.

With the present reproducing device, the playback data obtained on reading the digital audio data of the respective channels from the digital sound tracks 5L, 5R of the motion picture film 1 by the CCD lines sensors 10L, 10R are processed with 9-8 conversion by the demodulator 13L, 13R actuated responsive the playback clocks supplied from the playback clock generator 12 for demodulating the 9-dot pattern data into 1-byte data.

Besides, the audio data are processed with error correction by error correction circuits 14L, 14R, using the C1 parity data and the C2 parity data demodulated by the demodulator 13L, 13R, for regenerating the compressed audio data of the respective channels on a memory 15 along with error flags.

The audio decoder 16, actuated responsive to the playback clocks supplied from the playback clock generator 12, performs data expansion on the audio data for reproducing the audio data of the respective channels.

Figure 3:
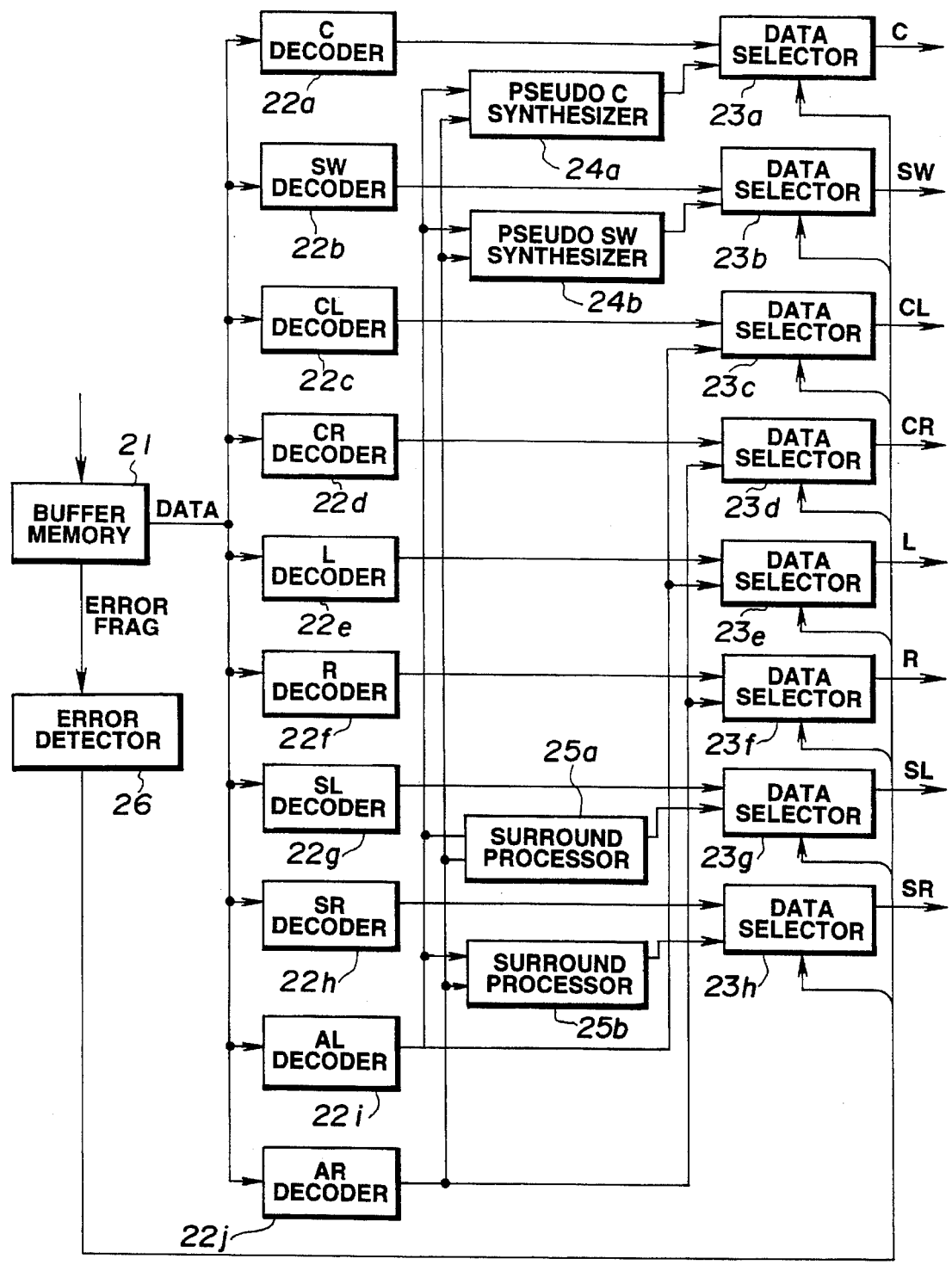
FIG. 3 is a block circuit diagram showing a concrete arrangement of an audio decoder in the reproducing device shown in FIG. 2.

FIG. 3 shows a concrete arrangement of the audio decoder 16. The audio decoder 16 has a buffer memory 21 for temporarily storing the audio data read out from the buffer memory 15 from which the channel-based data, that is the 10-channel audio data $C_n$, $SW_n$, $L_n$, $R_n$, $CL_n$, $CR_n$, $SL_n$, $SR_n$, $AL_n$ and $AR_n$, are distributed and supplied to the decoders 22a to 22j of the respective channels.

The decoders 22a to 22j perform decoding which is a counterpart operation of the high efficiency encoding for data compression described above.

The center channel audio data $C_n$, decoded by the decoder 22a, is outputted via a data select 23a. The sub-woofer channel audio data, decoded by the decoder 22b, is outputted via a data select, or 23b. The center left channel audio data $CL_n$, decoded by the decoder 22c, is outputted via a data selector 23c. The center right channel audio data $CR_n$, decoded by the decoder 22d, is outputted via a data select, or 23d. The left channel audio data $L_n$, decoded by the decoder 22e, is outputted via a data selector 23e. The right channel audio data $R_n$, decoded by the decoder 22f, is outputted via a data selector 23f. The surround left channel audio data $SL_n$, decoded by the decoder 22g, is outputted via a data select, or 23g. The surround right channel audio data $SR_n$, decoded by the decoder 22h, is outputted via a data selector 23h.

The left channel audio data $AL_n$, decoded by the decoder 22i, are supplied to synthesizers 24a, 24b and to surround processors 25a, 25b, while being supplied to the data selectors 23c, 23e. The right channel audio data $AR_n$, decoded by the decoder 22j, are supplied to synthesizers 24a, 24b and to the surround processors 25a, 25b, while being supplied to the data selectors 23d, 23f.

The synthesizer 24a calculates the sum of the left and right channel audio data $AL_n$, $AR_n$ supplied from the decoders 22i, 22j to produce pseudo audio data $C_n'$ of the center channel to supply, the audio data $C_n'$ to the data selector 23a. The synthesizer 24b calculates the sum of the left and right channel audio data $AL_n$, $AR_n$ supplied from the decoders 22i, 22j and cuts off high frequency components by a low-pass filter having cut-off characteristics on the order of 50 to 100 Hz to produce pseudo audio data $SW_n'$ of the sub-woofer channel to supply the audio data $SW_n'$ to the data selector 23b.

The surround processor 25a delays and sums the left and right channel audio data $AL_n$, $AR_n$ supplied from the decoders 22i, 22j to produce pseudo audio data $SR_n'$ for the surround left channel to supply the audio data $SL_n'$ to the data selector 23g. The surround processor 25b delays and sums the left and right channel audio data $AL_n$, $AR_n$ supplied from the decoders 22i, 22j to produce pseudo audio data $SR_n'$ for the surround right channel to supply the audio data $SR_n'$ to the data selector 23h.

Besides, the error detector 26 monitors error flags of the audio data $C_n$, $SW_n$, $L_n$, $R_n$, $CL_n$, $CR_n$, $SL_n$, $SR_n$, $AL_n$ and $AR_n$ distributed and supplied from the buffer memory 21 to the decoders 22a to 22j of the respective channels to control the data selectors 23a to 23h of the respective channels in a manner now to be explained.

That is, if there is no error in the audio data $C_n$, $SW_n$, $L_n$, $R_n$, $CL_n$, $CR_n$, $SL_n$, $SR_n$, $AL_n$ and $AR_n$ of the respective channels, the error detector 26 controls the data selectors 23a to 23j to output regular decoded data, that is the audio data $C_n$, $SW_n$, $L_n$, $R_n$, $CL_n$, $CR_n$, $SL_n$, $SR_n$, $AL_n$ and $AR_n$ of the respective channels decoded by the decoders 22i and 22j.

On the other hand, the error detector 26 controls the data selectors 23a to 23h so that, of the audio data $C_n$, $SW_n$, $L_n$, $R_n$, $CL_n$, $CR_n$, $SL_n$, $SR_n$ of the respective channels, decoded by the decoders 22a to 22h, the audio data of the channel judged to be replete with errors and unable to be decoded is replaced by pseudo audio data which are based on the left and right, channel audio data $AL_n$, $AR_n$ decoded by the decoders $22i$, $22j$.

With the above-described arrangement, if one or more decoders is unable to perform a decoding operation due to long burst errors, but the left and right channel audio data $AL_n$, $AR_n$ digitized from the analog audio signals can be decoded, it becomes possible to prevent sound interruption from being produced.

Besides, the audio data $AR_n$ digitized from the right channel analog audio signals are recorded on the digital sound track 5L on which the respective channel audio data $SL_n$, $L_n$ and $CL_n$ of the left, system ape recorded, while the audio data $AL_n$ digitized from the left channel analog audio signals are recorded on the sound track 5R on which the respective channel audio data $SR_n$, $R_n$ and $CR_n$ of the right system are recorded. Consequently, with the present reproducing system, even if extremely long burst errors be produced in the digital sound track 5L, for example, but there is no error in the other digital sound track 5R, the left channel audio data $AL_n$ is able to be reproduced, so that pseudo audio data $SL_n$ and $L_n$ of the left, system may be generated from the left channel audio data $AL_n$.

Figure 4:
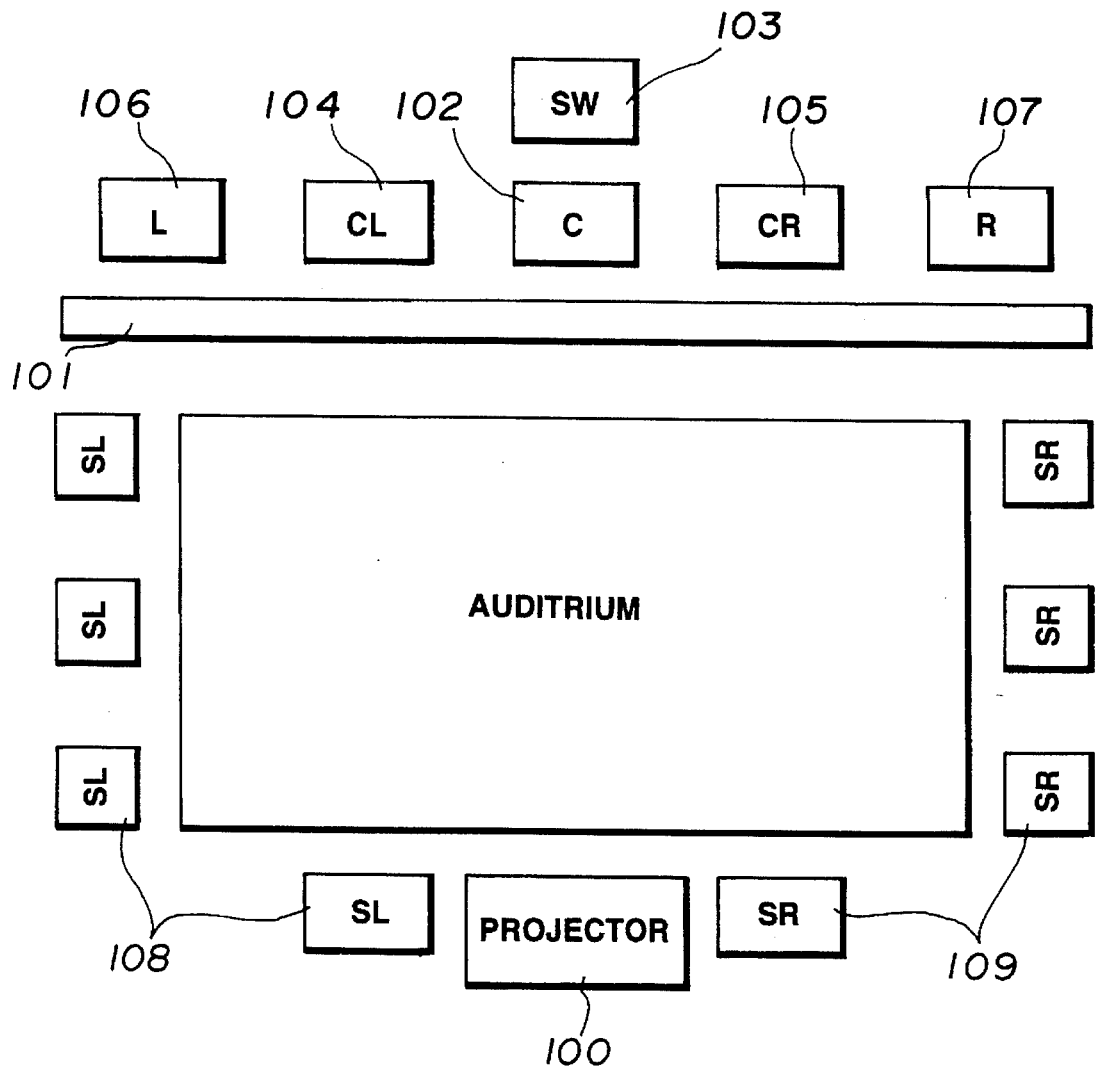
FIG. 4 is a schematic plan view showing an 8-channel digital sound system supplied with audio data reproduced by the reproducing device shown in FIG. 2.

The 8-channel audio data, reproduced by the present reproducing device, comprises 6-channel audio data, that is the audio data from a center speaker 102, a sub-woofer 103, a center left speaker 104, a center right, speaker 105, a left speaker and a right, speaker 107, arranged on the side of a screen 101 on which the picture reproduced from the picture recording area 2 of the motion picture film 1 is projected, and 2-channel audio data from a surround right speaker 108 and a surround right speaker 109, arranged on the side of a projector 100, as shown in FIG. 4. It becomes possible with the 8-channel digital sound system by the speakers 102 to 109 to reproduce the sound field with a concert-hall presence.

The center speaker 102 is arranged at the center of the side of the screen 101 and outputs the most critical playback sound by the center channel audio data C, such as the speech of actors or actresses.

The sub-woofer 103 outputs playback sounds by the audio data SW of the sub-woofer channel. The sub-woofer channel 103 effectively outputs the sound felt as vibrations, rather than the low-range sound, such as the sound of explosion, and may be effectively employed for a scene of explosion and so forth.

The left speaker 106 and the right speaker 107 are arranged on the left and right sides of the screen 101, respectively, and outputs the playback sound by the left channel audio data L and the playback sound by the right channel audio data R. The speakers 106 and 107 display stereophonic effects.

The center left speaker 104 and the center right speaker 105 are arranged between the center speaker 102 on one hand and the left and right speakers 106, 107 on the other hand and are adapted for outputting the playback sound by the center left channel audio data CL and the playback sound by the center right channel audio data LR. These speakers play the role of auxiliary speakers for the left speaker 106 and the right speaker 107. Above all, in a cinema house or the like having a large-sized screen and a large number of seats, the fixed position feeling of the sound image tends to be unstable depending on the seat positions. The center left speaker 104 and the center right speaker 105 are effective to create the more realistic fixed position feeling of the sound image.

The surround left speaker 108 and the surround right speaker 109 are arranged for surrounding the seats of the spectator, and output the reproduced sound by the surround left channel audio data SL and the reproduced sound by the surround right channel audio data SR. These speakers 108 and 109 are effective to give an impression of being surrounded by reverberating sound, acclamation and jubilee of the spectator to create a more stereophonic sound image.

What is claimed is:

1. A reproducing device for reproducing left channel audio data and right channel audio data recorded on a motion picture film, said left channel audio data including at least data for generating said right channel audio data and said right channel audio data including at least data for generating said left channel audio data, said reproducing device comprising:

first reproducing means for reproducing said left channel audio data;

second reproducing means for reproducing said right channel audio data;

first error detection means, in communication with said first reproducing means, for detecting errors in said reproduced left channel audio data;

second error detection means, in communication with said second reproducing means, for detecting errors in said reproduced right channel audio data;

first processor means, in communication with said first reproducing means, for generating said right channel audio data from said reproduced left channel audio data;

second processor means, in communication with said second reproducing means, for generating said left channel audio data from said reproduced right channel audio data;

first substitution means, in communication with said first reproducing means, said first error detection means, and said second processor means, for substituting said generated left channel audio data for said reproduced left channel audio data in response to a detected error in said reproduced left channel audio data;

second substitution means, in communication with said second reproducing means, said second error detection means, and said first processor means, for substituting said generated right channel audio data for said reproduced right channel audio data in response to a detected error in said reproduced right channel audio data.

2. The reproducing device of claim 1, wherein said generated left channel audio data comprises a first pseudo audio signal and wherein said generated right channel audio data comprises a second pseudo audio signal.

* * * * *